US009020267B2

(12) United States Patent
Ogawa

(10) Patent No.: US 9,020,267 B2
(45) Date of Patent: Apr. 28, 2015

(54) INFORMATION PROCESSING APPARATUS AND HANDWRITTEN DOCUMENT SEARCH METHOD

(71) Applicant: Kabushiki Kaisha Toshiba, Tokyo (JP)

(72) Inventor: Takehiro Ogawa, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 13/680,421

(22) Filed: Nov. 19, 2012

(65) Prior Publication Data

US 2014/0072225 A1 Mar. 13, 2014

(30) Foreign Application Priority Data

Sep. 7, 2012 (JP) .................................. 2012-197887

(51) Int. Cl.
*G06K 9/18* (2006.01)
*G06K 9/00* (2006.01)

(52) U.S. Cl.
CPC .............. *G06K 9/18* (2013.01); *G06K 9/00402* (2013.01)

(58) Field of Classification Search
CPC . G06K 9/222; G06K 9/00872; G06K 9/6292; G06K 9/00409; G06F 3/04883; G06F 3/03545; G06T 2207/10016
USPC .......................... 382/186–190; 345/156, 173
See application file for complete search history.

(56) References Cited

U.S. PATENT DOCUMENTS 6,130,962 A 10/2000 Sakurai

FOREIGN PATENT DOCUMENTS

| JP | 10-124502 A | 5/1998 |
| JP | 11-053402 A | 2/1999 |
| JP | WO2007/094078 A1 | 8/2007 |
| JP | 2010-109478 A | 5/2010 |

OTHER PUBLICATIONS

Notice of Reasons for Rejection mailed by Japan Patent Office on Jan. 29, 2013 in the corresponding to Japanese patent application No. 2012-197887 in 8 pages.

*Primary Examiner* — Ruiping Li
(74) *Attorney, Agent, or Firm* — Knobbe, Martens, Olson & Bear LLP

(57) ABSTRACT

According to one embodiment, an information processing apparatus includes a storage processor and a search module. The storage processor stores document data and character codes, the document data including stroke data corresponding to strokes input by a handwriting operation and the character codes corresponding to the stroke data. The search module performs at least one of a handwriting search according to strokes of a first search key and a character search according to a character code of a second search key, stroke data corresponding to the strokes of the first search key retrieved from the document data in the handwriting search and stroke data corresponding to the character code of the second search key retrieved from the character codes in the character search.

21 Claims, 9 Drawing Sheets

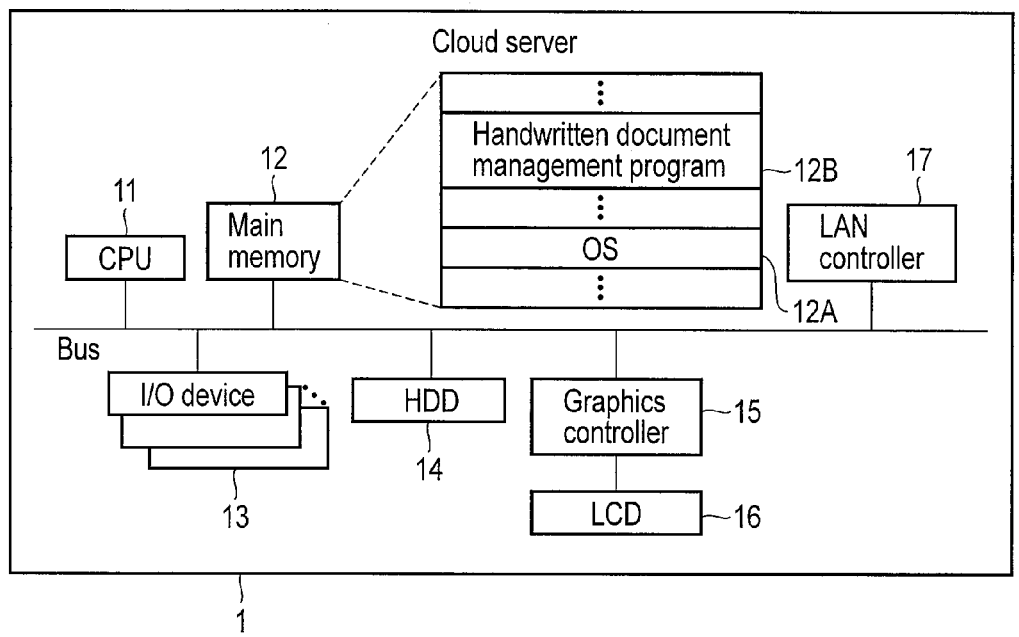
F I G. 2
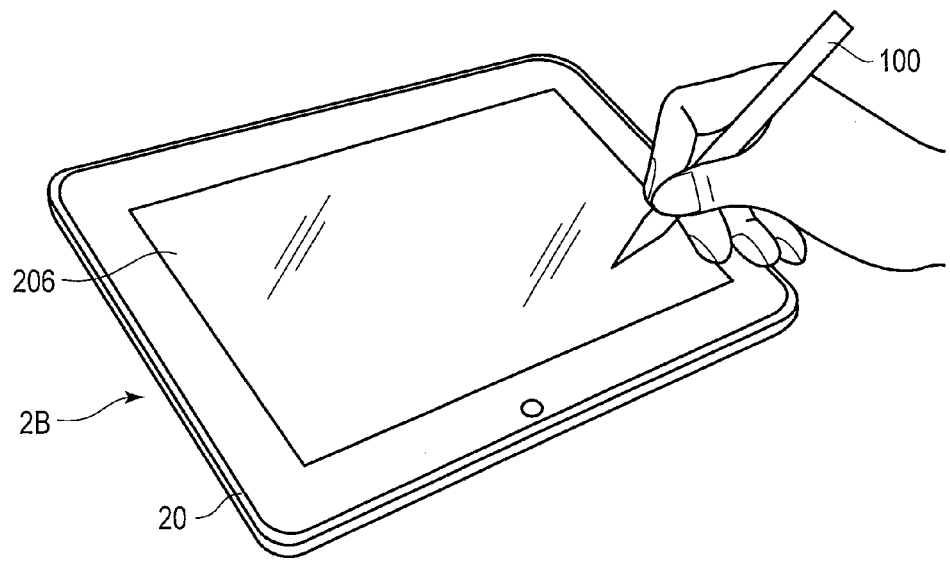
F I G. 3

| Page ID | User ID | Stroke 1 | | Stroke 2 | | ... |
|---|---|---|---|---|---|---|
| | | Stroke ID | Stroke data | Stroke ID | Stroke data | |
| 0001 | 0001 | 0001 | (X11, Y11), (X12, Y12), ... | 0002 | (X21, Y21), (X22, Y22), ... | ... |
| ... | ... | ... | ... | ... | ... | ... |

41A

F I G. 8

| Page ID | Stroke ID | Feature amount |
|---|---|---|
| 0001 | 0001 | xxx |
| 0001 | 0002 | yyy |
| ⋮ | ⋮ | ⋮ |
~42A
F I G. 9
| Page ID | Stroke ID range | Character string candidate 1 | Character string candidate 2 | Character string candidate 3 | ... |
|---|---|---|---|---|---|
| 0001 | 0001-0008 | XXXX1 | XXXX2 | XXXX3 | ... |
| 0011 | 0081-0088 | YYYY1 | YYYY2 | YYYY3 | ... |
| ⋮ | ⋮ | ⋮ | ⋮ | ⋮ | ⋮ |
43A
F I G. 10
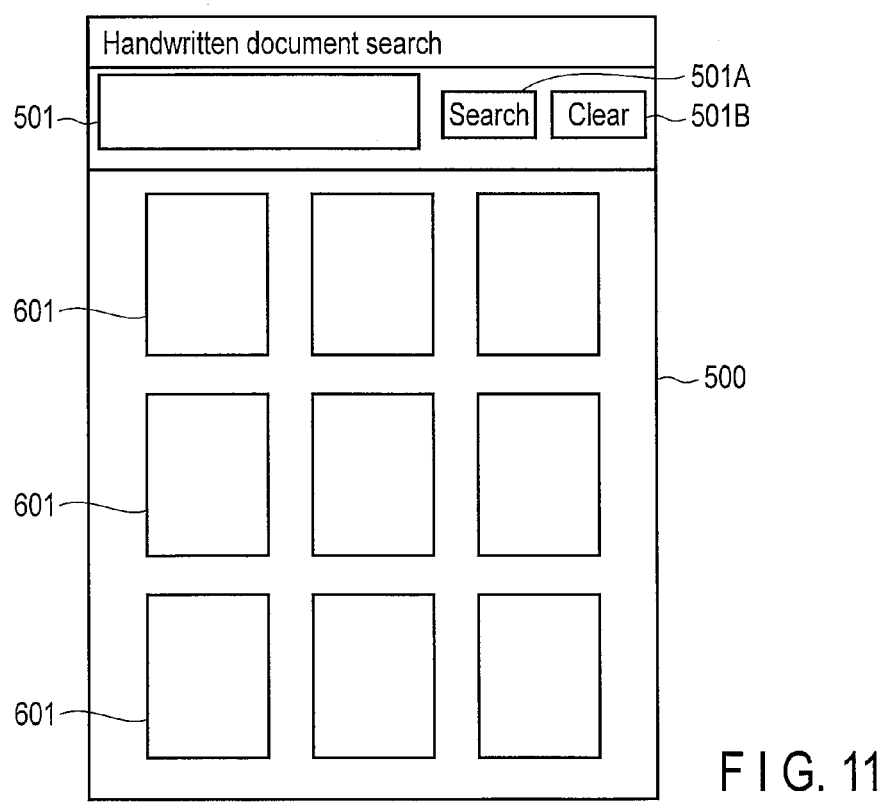
F I G. 11

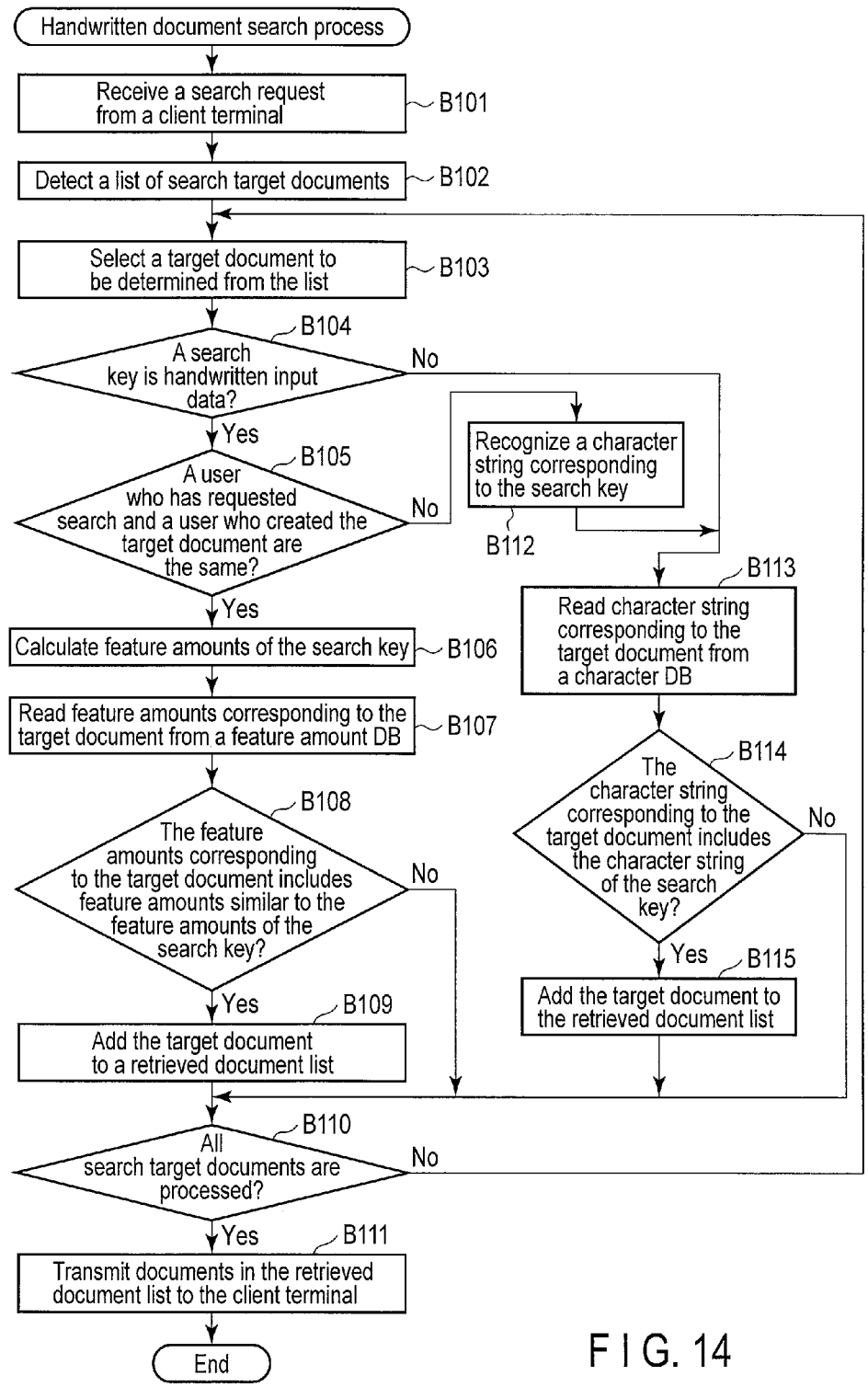
F I G. 14

INFORMATION PROCESSING APPARATUS AND HANDWRITTEN DOCUMENT SEARCH METHOD

CROSS-REFERENCE TO RELATED APPLICATIONS

This application is based upon and claims the benefit of priority from Japanese Patent Application No. 2012-197887, filed Sep. 7, 2012, the entire contents of which are incorporated herein by reference.

FIELD

Embodiments described herein relate generally to an information processing apparatus capable of retrieving a handwritten document and a handwritten document search method used by the information processing apparatus.

BACKGROUND

In recent years, various electronic devices such as tablets, PDA, and smart phones have been developed. Most of such kinds of electronic devices include a touch-screen display to facilitate an input operation by the user.

The user can give instructions to the electronic device to execute a function related to a menu or object by touching the menu or object displayed on the touch-screen display by a finger or the like.

Some of such electronic devices have a function to allow the user to handwrite a character, figure or the like on the touch-screen display. Such a handwritten document (handwritten page) including characters or figures is stored and also browsed when necessary.

However, when many handwritten documents are stored, it may become difficult to retrieve a document to be browsed from the documents. Therefore, various methods for searching handwritten documents have been proposed.

In the meantime, a shape or an order of strokes of each handwritten character or figure has features for respective users. However, since the stored handwritten documents are searched by not only a user who created the documents but also the other user, there is a possibility that the features for the respective users are not used efficiently in a handwritten document search.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram illustrating an exemplary system configuration of the information processing apparatus of the embodiment.

FIG. 3 is an exemplary perspective view illustrating an appearance of the client terminal of FIG. 1.

FIG. 8 is a view illustrating a configuration example of handwritten document data used by the information processing apparatus of the embodiment.

FIG. 9 is a view illustrating a configuration example of feature amount data used by the information processing apparatus of the embodiment.

FIG. 10 is a view illustrating a configuration example of character data used by the information processing apparatus of the embodiment.

FIG. 11 is an exemplary view illustrating a search screen displayed by the client terminal of FIG. 1.

FIG. 14 is a flowchart illustrating an example of the procedure of handwritten document search process executed by the information processing apparatus of the embodiment.

DETAILED DESCRIPTION

Various embodiments will be described hereinafter with reference to the accompanying drawings.

In general, according to one embodiment, an information processing apparatus includes a storage processor and a search module. The storage processor is configured to store handwritten document data and a plurality of character codes in storage, the handwritten document data including a plurality of stroke data corresponding to a plurality of strokes input by a handwriting operation and the plurality of character codes corresponding to the plurality of stroke data. The search module is configured to perform at least one of a handwriting search according to strokes of a first search key and a character search according to a character code of a second search key, first stroke data corresponding to the strokes of the first search key retrieved from the handwritten document data in the handwriting search, and second stroke data corresponding to the character code of the second search key retrieved from the plurality of character codes in the character search.

Figure 1:
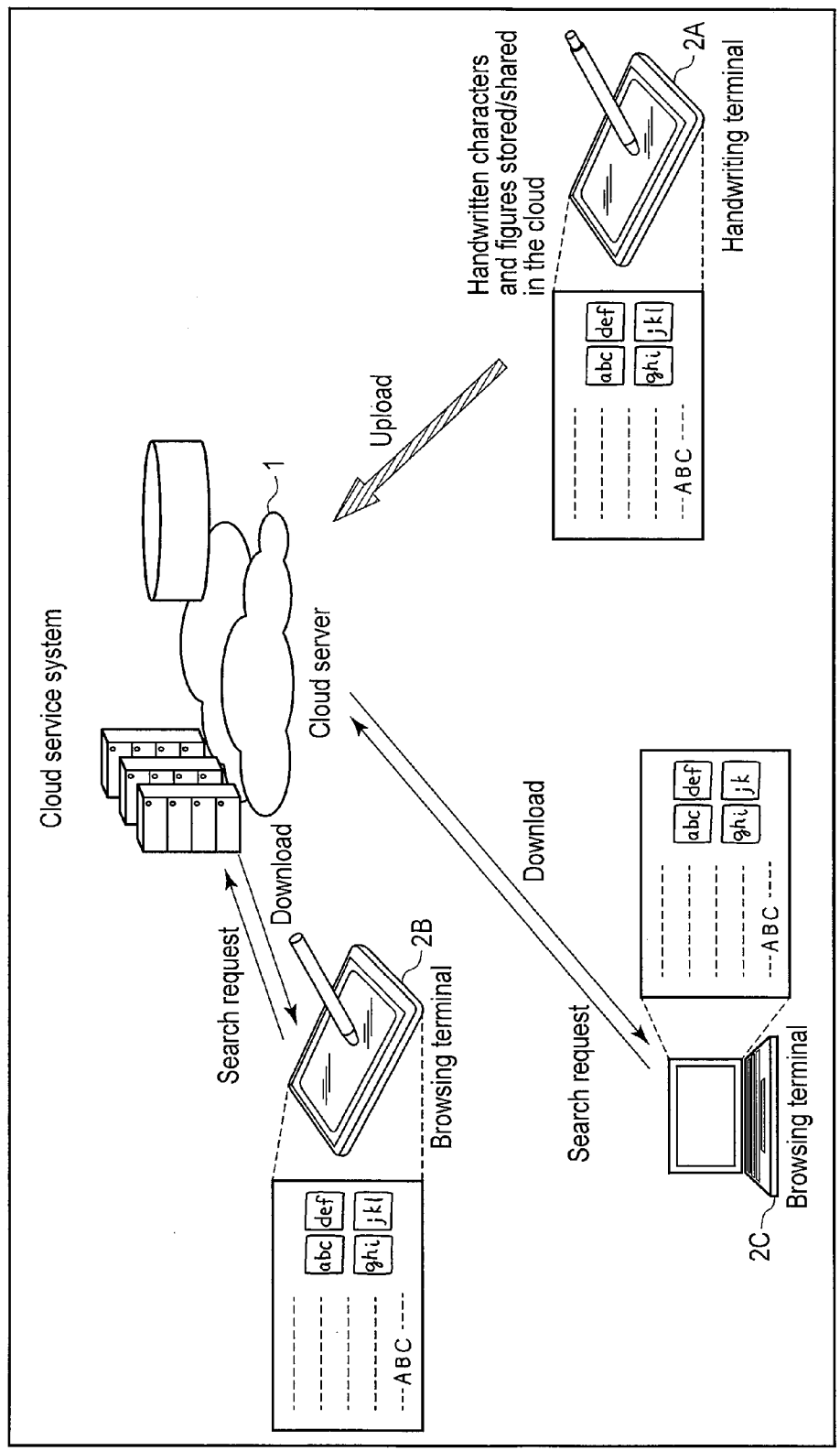
FIG. 1 is an exemplary view diagram illustrating an operation of a client terminal and an information processing apparatus (cloud server) according to an embodiment.

To begin with, referring to FIG. 1, a description is given of a cloud service system including an information processing apparatus according to an embodiment, and electronic devices which cooperate with the information processing apparatus. The information processing apparatus may be realized, for example, as a server computer (hereinafter also referred to as "cloud server") 1. The cloud server 1 executes an online storage service, and other various cloud computing services. The cloud server 1 can cooperate with various electronic devices such as a handwriting terminal 2A and a browsing terminal 2B, 2C.

The handwriting terminal 2A is, for instance, a pen-based portable electronic device which can execute a handwriting input by a pen or a finger. The handwriting terminal 2A may be realized as a tablet computer, a notebook-type personal computer, a smartphone, a PDA, etc. In addition, the browsing terminal 2B, 2C is an electronic device for browsing a handwritten document which is created by a handwriting input with use of the handwriting terminal 2A. The browsing terminal 2B, 2C may be realized as a tablet computer, a notebook-type personal computer, a desktop-type computer, a smartphone, a PDA, etc.

The cloud server 1 includes a communication device of, for example, a local area network (LAN). In addition, the handwriting terminal 2A and browsing terminal 2B, 2C include wireless communication devices of, for example, a wireless LAN. Accordingly, the cloud server 1 can communicate with each of the handwriting terminal 2A and browsing terminals 2B and 2C.

The handwriting terminal 2A transmits data of a handwritten document including characters (text) and graphics, which has been created by a handwriting input operation by a user, to the cloud server 1 via a network (e.g. Internet), and stores this data in a storage (e.g. a hard disk drive (HDD)) in the cloud server 1 ("upload"). In order to ensure a secure communication between the cloud server 1 and handwriting terminal 2A, the cloud server 1 may authenticate the handwriting terminal 2A at a time of starting the communication. In this case, a dialog for prompting the user to input an ID and/or a password may be displayed on the screen of the handwriting terminal 2A. Alternately, the ID of the handwriting terminal 2A, for example, may be automatically transmitted from handwriting terminal 2A to the cloud server 1.

Thereby, the handwritten document data, which has been generated on the handwriting terminal 2A, can be managed in the cloud server 1.

The cloud server 1 transmits handwritten document data, which is stored in the storage of the cloud server 1, to the browsing terminal 2B, 2C via the network (e.g. Internet). For example, the cloud server 1 retrieves handwritten document data item, which corresponds to a search request (search query) from the browsing terminals 2B, 2C, from a plurality of handwritten document data items in the storage of the cloud server 1 and transmits the search result to the browsing terminals 2B, 2C. The browsing terminals 2B, 2C receive ("download") the search result transmitted from the cloud server 1 and display the search result on the screen of the display of the browsing terminals 2B, 2C. Based on the received search result, the browsing terminals 2B, 2C display, for example, a list of the retrieved handwritten documents or retrieved handwritten documents on the screen.

The browsing terminal that requests the handwritten document search to the cloud server 1 may be either the browsing terminal 2B capable of handwriting input or the browsing terminal 2C incapable of handwriting input. The browsing terminal 2B capable of handwriting input transmits a search request including handwritten data corresponding to a character or figure handwritten by a handwritten input operation by the user to the server 1, and then acquires a search result by a search key of the handwritten data. The browsing terminal 2C incapable of handwritten input transmits a search request including character codes corresponding to a character string input by using a keyboard or the like to the server 1, and then acquires a search result by a search key of the character codes. The browsing terminal 2B capable of handwritten input may also transmit a search request including character codes corresponding to a character string input by using a software keyboard or the like to the server 1, and then acquire a search result by a search key of the character codes.

In order to ensure a secure communication between the cloud server 1 and browsing terminal 2B, 2C, the cloud server 1 may authenticate the browsing terminal 2B, 2C at a time of starting the communication. In this case, a dialog for prompting the user to input an ID and/or a password may be displayed on the screen of the browsing terminal 2B, 2C. Alternately, the ID of the browsing terminal 2B, 2C, for example, may be automatically transmitted from the browsing terminal 2B, 2C to the cloud server 1. The handwriting terminal 2A may also be used as the browsing terminal 2B.

FIG. 2 shows an example of the system configuration of the cloud server 1. The cloud server 1 includes a CPU (Central Processing Unit) 11, a main memory 12, an I/O derive 13, a hard disk drive (HDD) 14, a graphics controller 15, a liquid crystal display (LCD) 16, and a LAN controller 17.

The CPU 11 is a processor which executes various programs. The CPU 11 executes various computing processes and controls the respective components in the cloud server 1.

The main memory 12 is a memory for storing an operating system (OS) 12A and various applications programs such as a handwritten document management program 12B, which are executed by the CPU 11, and also storing various data. For example, the OS 12A and handwritten document management program 12B are loaded in the main memory 12. The handwritten document management program 12B manages a plurality of handwritten document data items uploaded from a client terminal. The handwritten document management program 12B has a function of storing handwritten document data uploaded from a client terminal in a storage device and a function of retrieving handwritten document data in accordance with a search request from a client terminal.

The I/O devices 13 are various input/output devices for executing data input/output from/to the cloud server 1. The HDD 14 is a storage device to store various programs and data. The various programs and data stored in the HDD 14 are loaded in the main memory 12 in response to requests from the respective components in the cloud server 1. As described above, handwritten document data items uploaded from client terminals are stored in the HDD 14.

The graphics controller 15 controls the LCD 16 which is used as a display monitor of the cloud server 1. A display signal, which is generated by the graphics controller 15, is sent to the LCD 16. By using the graphics controller 15 and LCD 16, for example, a screen corresponding to an operation by an administrator can be displayed.

The LAN controller 17 is a wired communication device which executes wired communication of, e.g. Ethernet™ standards.

FIG. 3 is an exemplary perspective view illustrating an external appearance of the browsing terminal 2B capable of handwriting input. It is assumed below that the browsing terminal 2B is realized as a tablet computer. The tablet computer 2B is a portable electronic device also called "tablet" or "slate computer". As shown in FIG. 3, the tablet computer 2B includes a main body 20 and a touch-screen display 206. The touch-screen display 206 is attached such that the touch-screen display 206 is laid on the top surface of the main body 20.

The main body 20 has a thin box-shaped housing. A flat-panel display and a sensor are built into the touch-screen display 206. The sensor is configured to detect a touch position of a pen or a finger on the screen of the flat-panel display. The flat-panel display may be, for instance, a liquid crystal display (LCD). As the sensor, for example, use may be made of a capacitance-type touch panel, or an electromagnetic induction-type digitizer. In the description below, it is assumed that two kinds of sensors, namely a digitizer and a touch panel, are both built in the touch-screen display 206.

Each of the digitizer and the touch panel is provided in a manner to cover the screen of the flat-panel display. The touch-screen display 206 detects not only a touch operation on the screen with use of a finger, but also a touch operation on the screen with use of a pen 100. The pen 100 may be, for instance, an electromagnetic-induction pen. The user can perform a handwriting input operation on the touch-screen display 206 by using an external object (pen 100 or finger). During the handwriting input operation, a path of movement of the external object (pen 100 or finger) on the screen, that is, a path (a trace of writing) of a stroke that is handwritten by the handwriting input operation, is drawn in real time, and thereby the path of each stroke is displayed on the screen. A path of movement of the external object during a time in which the external object is in contact with the screen corresponds to one stroke. A set of many strokes corresponding to handwritten characters or figures, that is, a set of many paths (traces of writing) is used not as image data but as handwritten data which includes time-series information indicative of coordinate series of the paths of strokes and the order relation between the strokes. The handwritten data may also be used, for example, as handwritten document data for each page. The details of this time-series information will be described later with reference to FIG. 6. In general terms, this time-series information means a set of time-series stroke data corresponding to a plurality of strokes. Each stroke data corresponds to one stroke, and includes coordinate data series (time-series coordinates) corresponding to points on the path of this stroke. The order of arrangement of these stroke data corresponds to an order in which strokes are handwritten.

The tablet computer 2B transmits handwritten data to be a search key to the server 1 and receives handwritten document data obtained as a result of searching based on the search key from the server 1. The browsing terminal 2B displays a handwritten document corresponding to the received handwritten document data, that is, the path corresponding to each of the strokes indicated by time-series information in the handwritten document data on the screen.

The tablet computer 2B can also read any existing handwritten document data from a storage medium to display the handwritten document corresponding to the read handwritten document data on the screen. In such a case, the user can also use the touch-screen display 206 to select a portion of the displayed handwritten document as a search key. The tablet computer 2B transmits a search request including handwritten data (stroke data) corresponding to the selected portion of the handwritten document to the server 1 and receives handwritten document data obtained as a result of searching based on the search key from the server 1.

Also in the present embodiment, handwritten document data (time-series information) can be managed as one or a plurality of pages. In such a case, the handwritten document data may be divided into area units that can be included in one screen to record a chunk of time-series information that can be included in one screen as a page. Alternatively, the page size may be made variable. In this case, the page size can be widened to an area larger than the size of one screen and a handwritten document of an area larger than the screen size can be handled as a page. If the whole page cannot be displayed on the display at the same time, the page may be scaled down or the display target portion in the page may be moved by vertical and horizontal scrolling.

Figure 4:
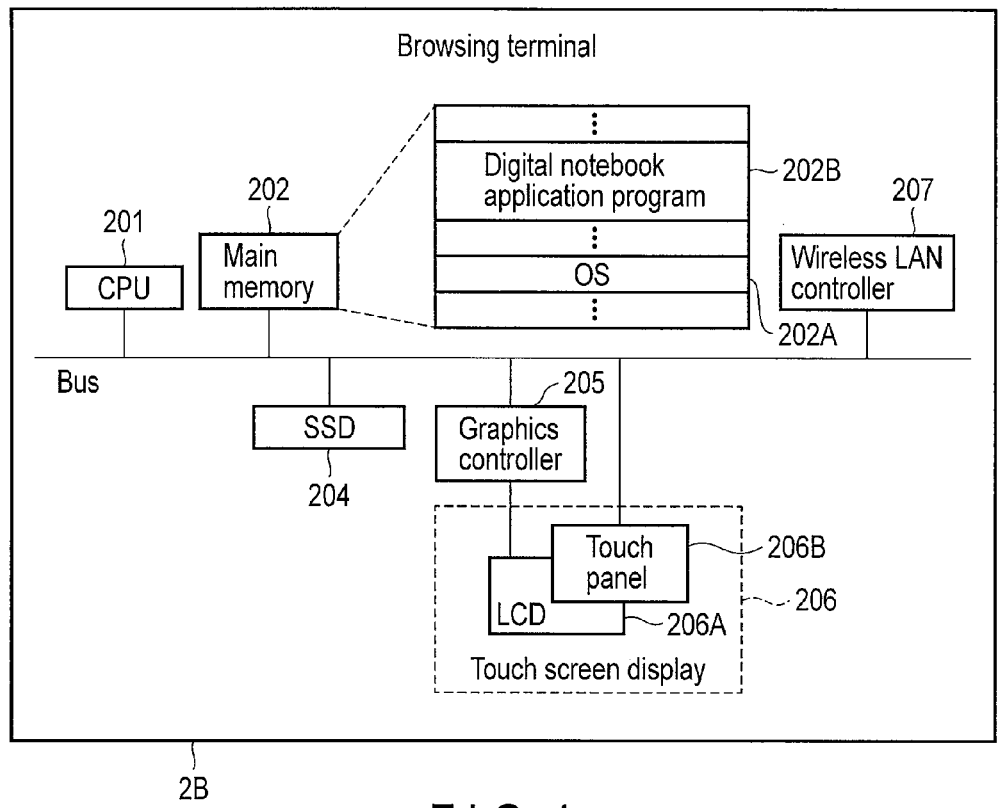
FIG. 4 is an exemplary block diagram illustrating a system configuration of the client terminal of FIG. 1.

FIG. 4 shows an example of the system configuration of the tablet computer 2B. The tablet computer 2B includes a CPU (Central Processing Unit) 201, a main memory 202, a solid state drive (SSD) 204, a graphics controller 205, the touch-screen display 206, and a wireless LAN controller 207.

The CPU 201 is a processor that executes various programs. The CPU 201 executes various computing processes and controls the respective components in the tablet computer 2B.

The main memory 202 is a memory for storing an operating system (OS) 202A and various application programs such as a digital notebook application program 202B, which are executed by the CPU 201, and also storing various data. For example, the OS 202A and the digital notebook application program 202B are loaded in the main memory 202. The digital notebook application program 202B has a function of requesting to the server 1 the search of handwritten document data and receiving and displaying the search result. The digital notebook application program 202B may also have a function of creating handwritten document data and transmitting the handwritten document data to the server 1.

The SSD 204 is a nonvolatile storage device to store various programs and data. Various programs and data stored in the SSD 204 are loaded in the main memory 202 in response to a request from each component in the tablet computer 2B.

The graphics controller 205 generates a display signal which is to be displayed on the touch-screen display 206. A flat-panel display 206A and a sensor, which is configured to detect a contact position of a pen or a finger on the screen of the flat-panel display 206A, are assembled in the touch-screen display 206. The flat-panel display 206A may be, for example, a liquid crystal display (LCD). As the sensor, for example, use may be made of a capacitance-type touch panel 206B, or an electromagnetic induction-type digitizer.

The wireless LAN controller 207 is configured to execute wireless communication based on e.g. IEEE 802.11 standards.

The tablet computer (browsing terminal) 2B capable of handwriting input may also be used as the handwriting terminal 2A. That is, with the above configuration of the tablet computer 2B, it becomes possible to create or edit a handwritten document and to upload the document to the server 1.

The browsing terminal 2C incapable of handwriting input is a computer in which, for example, the touch-screen display 206 is not provided. For example, the browsing terminal 2C transmits character codes corresponding to a character string input by using a keyboard as a search key to the server 1 and then receives handwritten document data obtained as a result of searching by the search key from the server 1. The browsing terminal 2C can display, like the browsing terminal 2B, a handwritten document corresponding to the received handwritten document data, that is, the path corresponding to each of the strokes indicated by time-series information in the handwritten document data on the screen. The tablet computer 2C can also read any existing handwritten document data from a storage medium to display the handwritten document corresponding to the read handwritten document data on the screen. The user can also use a pointing device such as a mouse and touchpad to select a portion of the displayed handwritten document as a search key. The browsing terminal 2C transmits a search request including handwritten data (stroke data) corresponding to the selected portion of the handwritten document to the server 1 and then receives handwritten document data obtained as a result of searching by the search key from the server 1.

Figure 5:
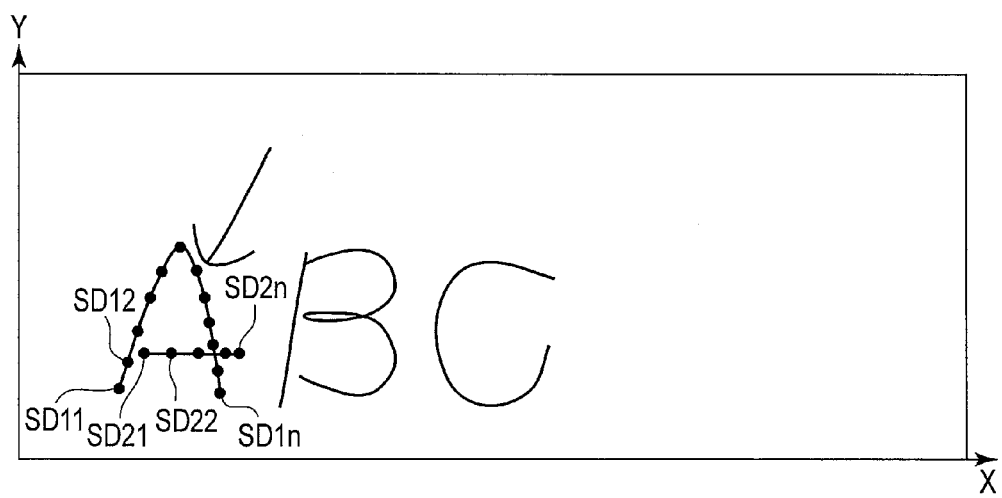
FIG. 5 is a view illustrating an example of a handwritten document managed by the information processing apparatus of the embodiment.

Next, the relationship between a stroke (such as a character, mark, figure, or table) handwritten by a user and time-series information will be described with reference to FIGS. 5 and 6. FIG. 5 shows an example of the handwritten document (handwritten character string or figure) handwritten on the touch-screen display 206 by using the pen 100 or the like.

In a handwritten document, there are frequently cases in which a character, figure or the like is handwritten and another character, figure or the like is further handwritten on the character, figure or the like. In FIG. 5, a case in which a handwritten character string "ABC" is handwritten in the order of "A", "B", and "C" and then a handwritten arrow is handwritten close to the handwritten character "A" is assumed.

The handwritten character "A" is represented by two strokes (a path in a "Λ" shape and a path in a "-" shape) handwritten using the pen 100 or the like, that is, two paths. The path of the pen 100 in the "Λ" shape firstly handwritten is sampled, for example, in real time at equal intervals, thereby obtaining time series coordinates SD11, SD12, . . . , SD1n of a stroke in the "Λ" shape. Similarly, the path of the pen 100 in the "-" shape secondly handwritten is sampled, thereby obtaining time series coordinates SD21, SD22, . . . , SD2n of a stroke in the "-" shape.

The handwritten character "B" is represented by two strokes handwritten using the pen 100 or the like, that is, two paths. The handwritten character "C" is represented by one stroke handwritten using the pen 100 or the like, that is, one path. The handwritten "arrow" is represented by two strokes handwritten using the pen 100 or the like, that is, two paths.

Figure 6:
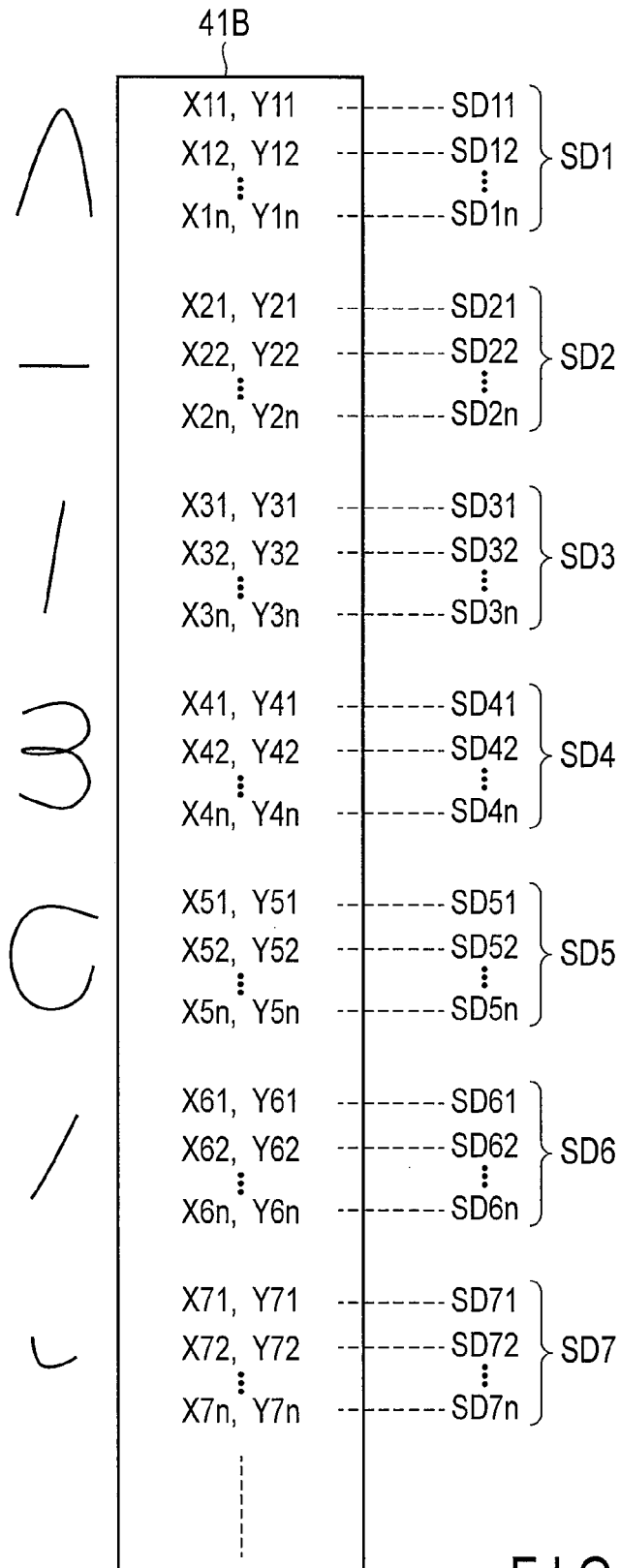
FIG. 6 is an exemplary view illustrating time-series information corresponding to the handwritten document of FIG. 5, the time-series information being stored in a storage medium by the information processing apparatus of the embodiment.

FIG. 6 shows time-series information 41B corresponding to the handwritten document in FIG. 5. The time-series information includes a plurality of stroke data items SD1, SD2, . . . , SD7. In the time-series information 41B, the stroke data SD1, SD2, . . . , SD7 is arranged in time series in the order of handwriting, that is, the order in which a plurality of strokes is handwritten.

In the time-series information 41B, the first and second stroke data items SD1, SD2 indicate two strokes of the handwritten character "A". The third and fourth stroke data items SD3, SD4 indicate two strokes of the handwritten character "B". The fifth stroke data item SD5 indicates one stroke of the handwritten character "C". The sixth and seventh stroke data items SD6, SD7 indicate two strokes of the handwritten "arrow".

Each stroke data item includes a coordinate data series (time-series coordinates) corresponding to one stroke, that is, a plurality of coordinates corresponding to a plurality of points on a path of the one stroke. In each stroke data item, the coordinates are arranged in time series in the order in which the stroke is written. Regarding the handwritten character "A", for example, the stroke data SD1 includes a coordinate data series (time-series coordinates) corresponding to points on the path of the stroke in the "Λ" shape of the handwritten character "A", that is, n coordinate data items SD11, SD12, . . . , SD1n. The stroke data SD2 includes a coordinate data series corresponding to points on the path of the stroke in the "-" shape of the handwritten character "A", that is, n coordinate data items SD21, SD22, . . . , SD2n. Incidentally, the number of coordinate data items may be different from stroke data to stroke data.

Each coordinate data item indicates an X coordinate and a Y coordinate corresponding to one point in the corresponding path. For example, coordinate data SD11 indicates an X coordinate (X11) and a Y coordinate (Y11) of the start point of the stroke in the "Λ" shape. SD1n indicates an X coordinate (X1n) and a Y coordinate (Y1n) of the end point of the stroke in the "Λ" shape.

Further, each coordinate data item may include time stamp information T corresponding to a timing when the point corresponding to the coordinates is handwritten. The timing of handwriting may be an absolute time (for example, year, month, day, hour, minute, second) or a relative time relative to some timing as a reference. For example, the absolute time (for example, year, month, day, hour, minute, second) when a stroke is started to be written may be added to each stroke data item as time stamp information and further, a relative time indicating a difference from the absolute time may be added to each coordinate data item in the stroke data as time stamp information T.

Thus, by using time-series information in which the time stamp information T is added to each coordinate data item, the temporal relationship between strokes can be represented more precisely.

Further, information (Z) indicating a handwriting pressure may be added to each coordinate data item.

In the present embodiment, as described above, since a handwritten document is stored not as an image or a character recognition result but as the time-series information 41B constituted of a set of stroke data in time series, handwritten characters can be handled without depending on the language of handwritten characters. Therefore, the structure of the time-series information 41B in the present embodiment can be commonly used for various characters in different languages.

Figure 7:
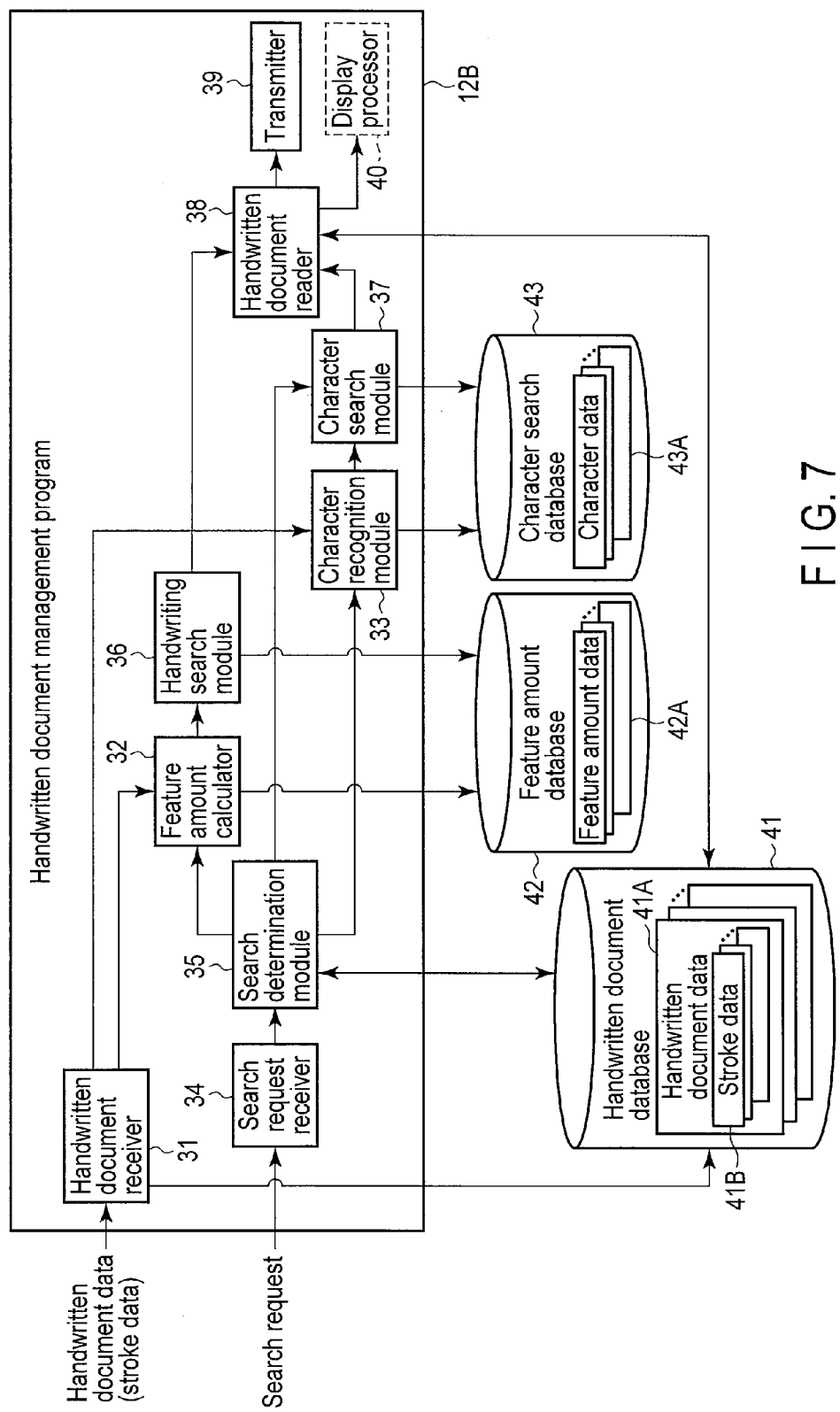
FIG. 7 is an exemplary block diagram illustrating a functional configuration of a handwritten document management program executed by the information processing apparatus of the embodiment.

Next, with reference to FIG. 7, the functional configuration of the handwritten document management program 12B executed by the server 1 will be described. The handwritten document management program 12B has, as described above, a function to store handwritten document data uploaded from a client terminal (for example, the handwriting terminal 2A) in a storage device and a function to acquire handwritten document data in accordance with a search request from a client terminal (for example, the browsing terminal 2B, 2C).

The handwritten document management program 12B includes, for example, a handwritten document receiver 31, a feature amount calculator 32, a character recognition module 33, a search request receiver 34, a search determination module 35, a handwriting search module 36, a character search module 37, a handwritten document reader 38, and a transmitter 39.

First, the operation when handwritten document data is uploaded from a client terminal (the handwriting terminal 2A) to the server 1 will be described.

The handwritten document receiver 31 receives handwritten document data uploaded by the client terminal. The handwritten document receiver 31 stores the received handwritten document data in a handwritten document database 41 (for example, a storage medium like the HDD 14). The handwritten document receiver 31 adds, for example, identification information (page ID) capable of uniquely identifying the handwritten document (handwritten page) and identification information (user ID) of the user who has created the handwritten document to the received handwritten document data, and then stores the received handwritten document data in the handwritten document database 41.

FIG. 8 shows a configuration example of handwritten document data 41A stored in the handwritten document database 41. The handwritten document data 41A includes a plurality of entries corresponding to a plurality of handwritten documents (handwritten pages). Each entry includes, for example, the page ID, user ID, stroke ID, and stroke data. "Page ID" in an entry corresponding to a handwritten document is indicative of identification information which is given to the handwritten document. "User ID" is indicative of identification information which is given to the user who has created the handwritten document. "Stroke ID" is indicative of identification information which is given to a stroke handwritten in the handwritten document. "Stroke data" is indicative of the coordinate data series (time-series coordinates) 41B corresponding to the stroke handwritten in the handwritten document.

As shown in FIG. 8, an entry corresponding to a handwritten document includes a plurality of pairs of "stroke ID" and "stroke data". That is, an entry corresponding to a handwritten document includes as many pairs of "stroke ID" and "stroke data" as the number of strokes handwritten in the handwritten document.

The handwritten document data 41A may be a handwritten document file in which description similar to the above entry is written.

The handwritten document receiver 31 outputs the received handwritten document data 41A to the feature amount calculator 32 and the character recognition module 33.

The feature amount calculator 32 calculates feature amounts corresponding to strokes handwritten in the handwritten document by analyzing the stroke data items (time-series information) 41B in the handwritten document data 41A received by the handwritten document receiver 31. The feature amount calculator 32 calculates, for example, a feature amount indicative of a shape of a stroke (e.g. a gradient of a stroke) by using a coordinate data series corresponding to each stroke. The feature amount calculator calculates the feature amount whose features other than the shape like the size (length) of the stroke and the number of coordinates (number of coordinate data items) sampled on the stroke are normalized. The feature amount calculator 32 stores feature amount data 42A including the calculated feature amounts in a feature amount database 42 (for example, a storage medium like the HDD 14).

FIG. 9 shows a configuration example of the feature amount data 42A stored in the feature amount database 42. The feature amount data 42A includes entries corresponding to strokes included in the handwritten documents (handwritten pages). Each entry includes, for example, the page ID, user ID, and feature amount. "Page ID" in an entry corresponding to a stroke is indicative of identification information which is given to the handwritten document to which the stroke is handwritten. "Stroke ID" is indicative of identification information which is given to the stroke. "Feature amount" is indicative of a feature amount calculated by analyzing the stroke.

The character recognition module 33 recognizes handwritten characters or symbols handwritten in the handwritten document by analyzing the stroke data (time-series information) 41B in the received handwritten document data 41A. The character recognition module 33 converts each of the recognized handwritten characters or symbols into a character code. More specifically, the character recognition module 33 divides a plurality of strokes into character blocks including strokes for each character. Then, the character recognition module 33 recognizes the character corresponding to strokes in each character block by using prepared handwritten character dictionary data. In the handwritten character dictionary data, for example, each of various characters and symbols is associated with a typical pattern of the handwritten character (symbol) obtained by analyzing a lot of handwritten character data (handwritten character data by many people). The character recognition module 33 recognizes, for example, a character whose typical pattern has a similarity equal to or more than a threshold to strokes in the character block. In consideration of possible errors of character recognition, a plurality of character candidates whose similarity is equal to or more than the threshold may be determined. The character recognition module 33 converts the recognized character into a character code.

Next, the character recognition module 33 stores character data 43A indicative of a relationship between the stroke (stroke group) in the character block and the character code in a character search database 43. The character recognition module 33 stores, for example, the character data 43A including the range of stroke ID corresponding to the stroke (stroke group) and the character code in the character search database 43 (for example, a storage medium like the HDD 14). The character recognition module 33 may also store the character data 43A, which includes character codes of a character string (character string candidates) obtained by combining a character (character candidates) recognized for each character block in units of words or lines in a handwritten document and the range of stroke ID of the stroke group corresponding to the character string, in the character search database 43.

FIG. 10 shows a configuration example of the character data 43A stored in the character search database 43. The character data 43A includes, for example, a plurality of entries corresponding to a plurality of stroke groups recognized by analyzing strokes handwritten in a handwritten document (handwritten page). Each entry includes, for example, "page ID", "stroke ID range", and "character string". "Page ID" in an entry corresponding to a stroke group is indicative of identification information which is given to the handwritten document to which the stroke group is handwritten. "Stroke ID range" is indicative of the range of identification information which is given to the stroke group. "Character string" indicates character codes (character code group) of a plurality of character string candidates corresponding to a character recognition result for the stroke group.

In the character data 43A, as described above, a stroke group may be associated with a plurality of character string candidates (character codes) based on a character recognition result. That is, a stroke range overlapping with the stroke range associated with a first character code in an entry may be associated with a second character code in another entry. By associating a stroke group with a plurality of character string candidates by the character recognition module 33, the handwritten document desired to be acquired by the user can be retrieved with precision by a character search using the character code described later.

Next, the operation when the handwritten document data search based on a search key is requested from the server 1 by the client terminal (browsing terminal) 2B, 2C will be described. The handwritten document management program 12B searches the handwritten document data 41A in the storage by performing at least one of a handwriting search according to strokes of a first search key and a character search according to a character code of a second search key. In the handwriting search, first stroke data corresponding to the strokes of the first search key is retrieved from the handwritten document data. In the character search, second stroke data corresponding to the character code (or character codes) of the second search key is retrieved from a plurality of character codes corresponding to a plurality of stroke data in the handwritten document data.

First, the search request receiver 34 receives a search request (search query) transmitted from the client terminal 2B, 2C. The search request includes, for example, the user ID of the user using the client terminal 2B, 2C (that is, the user who requests the handwritten document search) and the search key. The search request receiver 34 outputs the received search request to the search determination module 35.

The search determination module 35 acquires a list of handwritten documents to be searched from the handwritten document database 41. The search determination module 35 detects, for example, handwritten documents to which access by the user who requested the search is permitted by referring to the handwritten document database 41 and generates a list of handwritten documents to be searched. Then, the search determination module 35 determines which search process of the handwriting search and the character search to perform on each of handwritten documents in the acquired list. In the handwriting search, a handwritten document is searched for based on the feature amount (the feature amount data 42A) indicative of the shape of each handwritten stroke or the time series order of the strokes (order of strokes in handwriting). In the character search, a handwritten document is searched for based on a character recognition result (the character data 43A) of the handwritten strokes.

More specifically, the search determination module 35 selects a target handwritten document, which is to be determined whether the search key is included, from the acquired list. Next, the search determination module 35 determines whether the search key in the search request includes handwritten input data, that is, the search key includes time-series information including stroke data. The handwritten input data has the structure described with reference to FIGS. 5 and 6.

If the search key does not include handwritten input data, that is, the search key includes one or more character codes, the search determination module 35 determines to perform at least a character search using the character codes for the target handwritten document. The search determination module 35 requests the character search module 37 to perform a character search using the character codes for the target handwritten document.

The character search module 37 reads the character data 43A corresponding to the target handwritten document from the character search database 43 in accordance with the request from the search determination module 35. Then, the character search module 37 determines whether the character codes of the search key is included in character codes (for example, character codes of a plurality of character string candidates) in the read character data 43A. In other words, the character search module 37 determines whether one or more character codes corresponding to the search key are included in a plurality of character codes corresponding to the target handwritten document by performing a character search using the character codes corresponding to the target handwritten document and the one or more character codes corresponding to the search key. Then, if the one or more character codes corresponding to the search key are included in the character codes corresponding to the target handwritten document, the target handwritten document is determined as a handwritten document including the search key. In that case, the character search module 37 adds the target handwritten document to a retrieved document list as a handwritten document corresponding to the search key. The character search module 37 adds, for example, identification information (page ID) attached to the target handwritten document to the retrieved document list.

On the other hand, if the search key includes handwritten input data, the search determination module 35 determines whether the user who created the target handwritten document is the search user using the client terminal (search user who requested the handwritten document search). That is, the search determination module 35 determines whether the user ID of the creation user who created the target handwritten document and the user ID of the search user using the client terminal are identical. If the user who created the target handwritten document is the user using the client terminal, the search determination module 35 determined to perform at least a handwriting search using handwritten input data for the target handwritten document. The search determination module 35 requests the feature amount calculator 32 and the handwriting search module 36 to perform a handwriting search using handwritten input data for the target handwritten document.

The feature amount calculator 32 calculates one or more feature amounts corresponding to one or more strokes handwritten as the search key by analyzing stroke data (time-series information) of the search key in response to a request by the search determination module 35. The feature amount calculator 32 calculates, for example, a feature amount indicative of a shape of a stroke (e.g. a gradient of a stroke) by using a coordinate data series corresponding to each stroke. The feature amount calculator 32 calculates the feature amount by normalizing features other than the shape like the size (length) of the stroke and the number of coordinates (number of pieces of coordinate data) sampled on the stroke. Then, the feature amount calculator 32 outputs one or more calculated feature amounts of the search key to the handwriting search module 36.

The handwriting search module 36 reads feature amounts corresponding to the target handwritten document from the feature amount database 42. Feature amounts corresponding to the target handwritten document are a plurality of feature amounts corresponding to a plurality of strokes in the handwritten document. The handwriting search module 36 determines whether there is any feature amount corresponding to the feature amounts of the search key among the feature amounts corresponding to the target handwritten document by performing a handwriting search using the feature amounts corresponding to the target handwritten document and one or more feature amounts corresponding to the search key. That is, the handwriting search module 36 determines whether any handwritten character or figure similar to the search key (that is, any handwritten character or figure close to the search key) is included in the target handwritten document by using the feature amounts corresponding to the target handwritten document and the feature amounts of the search key. More specifically, for example, if one or more feature amounts whose similarity to one or more feature amounts corresponding to the search key is equal to or more than a threshold is included in the feature amounts corresponding to the target handwritten document, the handwriting search module 36 determines the target handwritten document as a handwritten document including the search key. In that case, the handwriting search module 36 adds the target handwritten document to the retrieved document list as a handwritten document corresponding to the search key. The handwriting search module 36 adds, for example, identification information (page ID) given to the target handwritten document to the retrieved document list.

In the above handwriting search, if the user who created the target handwritten document is the user who requested the handwritten document search, the handwritten document can be retrieved by using unique features of each user such as character shapes, handwriting order of strokes, and how to omit strokes when writing characters (e.g. cursive script), without using typical patterns of handwritten characters having common features among users like handwritten character dictionary data. Feature amounts of the handwritten document and feature amounts of the search key which include unique feature of a user are used and thus, the precision with which whether the search key is included in a handwritten document is determined can be improved. Additionally, a handwritten document search can be performed by using a symbol or figure whose corresponding character code is unavailable (a symbol or figure that cannot be converted into the character code) as the search key.

On the other hand, if the user who created the target handwritten document is not the user using the client terminal, the search determination module 35 determines that at least a character search using handwritten input data for the target handwritten document is performed. The search determination module 35 requests the character recognition module 33 and the character search module 37 to perform a character search using handwritten input data for the target handwritten document.

The character recognition module 33 recognizes characters or symbols corresponding to a plurality of strokes handwritten as the search key by analyzing time-series information included in the handwritten input data of the search key in response to a request by the search determination module 35. Like the above character recognition for a handwritten document, the character recognition module 33 first divides a plurality of strokes into character blocks including strokes for each character. Then, the character recognition module 33 recognizes the character corresponding to strokes in each character block by using prepared handwritten character dictionary data. In the handwritten character dictionary data, for example, each of various characters and symbols is associated with a typical pattern of the handwritten character (symbol) obtained by analyzing a lot of handwritten character data (handwritten character data by many people). The character recognition module 33 detects, for example, a character whose typical pattern has the maximum similarity to strokes in the character block from a plurality of characters in the handwritten document dictionary data. The character recognition module 33 converts the detected character into the character code. If the search key includes a plurality handwritten characters, the character recognition module 33 acquires a plurality of characters codes (character code series) corresponding to the handwritten characters. The character recognition module 33 outputs the character code (character codes) corresponding to the character (character string) recognized from the search key to the character search module 37.

The character search module 37 reads the character data 43A corresponding to the target handwritten document from the character search database 43. Then, the character search module 37 determines whether the character code of the search key output by the character recognition module 33 is included in character codes (for example, character codes of a plurality of character string candidates) in the read character data 43A. In other words, the character search module 37 determines whether one or more character codes (character code series) corresponding to the search key are included in a plurality of character codes (character code series) corresponding to the target handwritten document. If one or more character codes of the search key are included in the character codes of the target handwritten document, the character search module 37 determines that the target handwritten document is a handwritten document including the search key. Then, the character search module 37 adds the target handwritten document to the retrieved document list as a handwritten document appropriate for the search key. The character search module 37 adds, for example, identification information (page ID) given to the target handwritten document to the retrieved document list.

With the above processing, after the search of either the handwriting search or the character search being subjected for all target handwritten documents, the handwritten document reader 38 reads the handwritten document data 41A, which corresponds to the handwritten document (page ID) in the retrieved document list, from the handwritten document database 41. Then, the transmitter 39 transmits the read handwritten document data 41A and data indicative of one or more strokes corresponding to the search key in the handwritten document (that is, data indicative of the hit word) to the client terminal 2B, 2C that requested the handwritten document search. The one or more strokes corresponding to the search key in the handwritten document are identified during the search by the handwriting search module 36 or the character search module 37. The one or more strokes are indicated by, for example, the stroke ID (range of stroke ID) of stroke data included in the handwritten document data. If, for example, a predetermined number of handwritten document data items including the search key are not acquired after the search of either the handwriting search or the character search being performed for all target handwritten documents, the character search may further be performed for the handwritten document data 41A having been determined whether the search key is included by the handwriting search.

The client terminal 2B, 2C receives the handwritten document data 41A and data indicative of the stroke (stroke ID) corresponding to the search key transmitted from the transmitter 39 of the server 1. The client terminal 2B, 2C displays a search result on the screen based on the search key by using the received data. The client terminal 2B, 2C displays, for example, paths of a plurality of strokes corresponding to a plurality of stroke data items in the received handwritten document data 41A and highlights, among paths of the strokes, paths of the strokes corresponding to the search key (hit word portion). When the path of the stroke corresponding to the search key is highlighted, the client terminal 2B, 2C may highlight strokes detected by the handwriting search and strokes detected by the character search in different display forms (for example, different colors). Incidentally, the client terminal 2B, 2C may display a thumbnail of the handwritten document in which paths of the strokes corresponding to the stroke data items in the received handwritten document data 41A, and highlight the path of the stroke corresponding to the search key in the thumbnail. If, for example, handwritten document data items 41A are received as a search result, the client terminal 2B, 2C displays a list of thumbnails of a plurality of handwritten documents in which hit words are highlighted.

The above handwritten document management program 12B may be executed on the client terminal 2B, 2C. In such a case, for example, the handwritten document management program 12B searches the handwritten document data 41A stored in a storage device such as the SSD 204 in response to a search request (search key) input on the touch-screen display 206. The program 12B then displays the search result on the screen of the touch-screen display 206. The handwritten document management program 12B further includes a display processor 40 which displays, as described above, a search result based on the search key on the screen.

An example of a handwritten document search screen 500 displayed by the client terminal 2B, 2C (or the display processor 40) will be described with reference to FIGS. 11 to 13.

As shown in FIG. 11, the handwritten document search screen 500 includes a search key input area 501, a search button 501A, and a clear button 501B. The search key input area 501 is an input area to handwrite a character string or figure to be the search key. The search button 501A is a button to request the server 1 (the search request receiver 34) to perform handwritten document search process. The clear button 501B is a button for delete (clear) instruction of a character string or figure handwritten in the search key input area 501.

The search key input area 501 may be used as an input area to input a character string of the search key by using a keyboard (software keyboard). In such a case, the clear button 501B is used to give instructions to delete (clear) a character string or figure input into the search key input area 501 by the keyboard.

The handwritten document search screen 500 further includes an area to display a plurality of handwritten document thumbnails 601. In the example shown in FIG. 11, the handwritten document search screen 500 can display nine handwritten document thumbnails 601 corresponding to nine handwritten documents of handwritten documents (handwritten pages) acquired as a search result.

Figure 12:
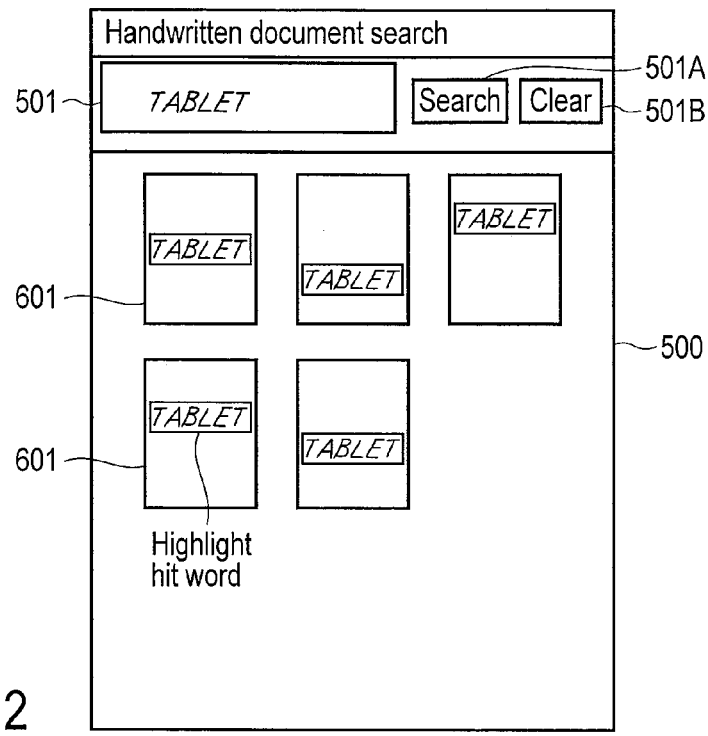
FIG. 12 is a view illustrating an example of a search result displayed on the search screen of FIG. 11.

If, as shown in FIG. 12, the search button 501A is pressed while a handwritten character string "TABLET" is input in the search key input area 501, a handwritten document search based on stroke data corresponding to the strokes constituting the handwritten character string "TABLET" is requested to the server 1. Then, the handwritten document thumbnails 601 corresponding to handwritten documents including the handwritten character string "TABLET" are displayed on the handwritten document search screen 500 based on a search result received from the server 1. That is, the handwritten document thumbnails 601 corresponding to the handwritten documents including strokes assumed to be the handwritten character string "TABLET" are displayed on the handwritten document search screen 500. In FIG. 12, a case when five handwritten documents are retrieved as handwritten documents including the handwritten character string "TABLET" is shown. The hit word, that is, the handwritten character string "TABLET" in the five handwritten document thumbnails 601 (that is, strokes corresponding to the handwritten character string "TABLET") is highlighted.

Figure 13:
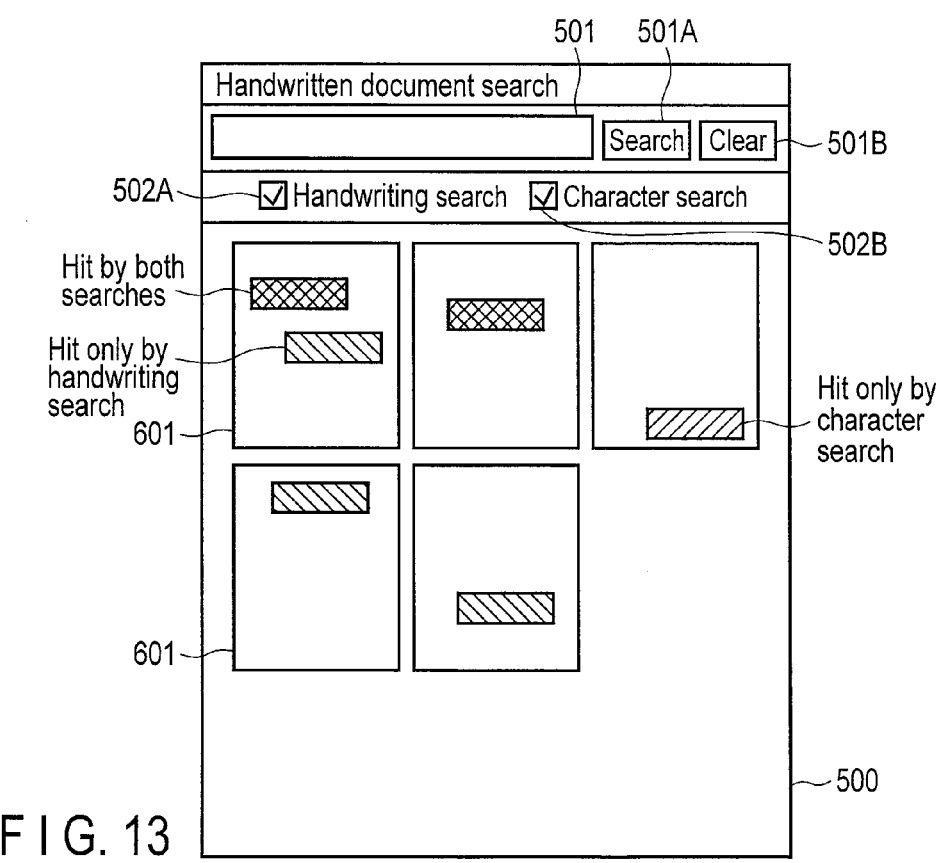
FIG. 13 is a view illustrating another example of the search result displayed on the search screen of FIG. 11.

Also, as shown in FIG. 13, buttons 502A, 502B to select the type of search requested to the server 1 may further be displayed on the handwritten document search screen 500. The user can instruct the server 1 to perform a handwritten document search by one of the handwriting search and the character search or both by using the "handwriting search" button 502A and the "character search" button 502B. The client terminal 2B, 2C transmits a search request, which includes information indicative of the type of search specified by using the "handwriting search" button 502A and the "character search" button 502B, to the server 1. The server 1 performs the search of the specified type in accordance with the search request.

In FIG. 13, a case when the handwritten document search is performed by both the handwriting search and the character search is shown. In this case, the character string (hit word) hit in both searches, the character string hit only in the handwriting search, and the character string hit only in the character search in the handwritten document thumbnails 601 are highlighted in different display forms. For example, the character string hit in both searches, the character string hit only in the handwriting search, and the character string hit only in the character search are highlighted in different colors.

An example in which the handwritten document data 41A and data indicative of a portion corresponding to the search key in the handwritten document is described above, but the server 1 (the transmitter 39) may transmit thumbnails of handwritten documents in the retrieved document list in which portions corresponding to the search key are highlighted to the client terminal 2B, 2C. In such a case, the client terminal 2B, 2C needs only to display thumbnails of handwritten documents received from the server 1, thereby reducing process on the client terminal 2B, 2C.

Next, an example of the procedure of handwritten document search process executed by the server 1 will be described with reference to the flowchart in FIG. 14.

First, the search request receiver 34 receives a search request from the client terminal 2B, 2C (block B101). The search request includes, for example, a user ID of the user who requests the search, a search key and the like. The search determination module 35 acquires a list of handwritten documents to be searched with reference to the handwritten document database 41 in response to the reception of the search request (block B102) and selects a handwritten document (target handwritten document), which is to be determined whether the search key is included, from the acquired list (block B103).

Next, the search determination module 35 determines whether the search key is handwritten input data (block B104). That is, the search determination module 35 determines whether the search key is time-series information or character codes. The time series information includes one or more stroke data items corresponding to one or more strokes. In the time series information, the stroke data items are arranged in the order in which the one or more strokes are handwritten. The character codes correspond to a character string input by the keyboard.

When the search key is handwritten input data (that is, time-series information in which stroke data is arranged) (YES in block B104), the search determination module 35 determines whether the user who requested the search (that is, the user who has input the search key by handwriting) and the user who has created the target handwritten document are identical (block B105). If the user requested the search and the user who has created the target handwritten document are identical (YES in block B105), the feature amount calculator 32 calculates a feature amount of the search key by analyzing the handwritten input data of the search key (block B106): The handwriting search module 36 reads a plurality of feature amounts corresponding to the target handwritten document from the feature amount database 42 (block B107), and determine whether any feature amount similar to the feature amount of the search key is included in the feature amounts of the target handwritten document (block B108). If, for example, the similarity between a first feature amount among a plurality of feature amounts of the target handwritten document and the feature amount of the search key is equal to or more than a threshold, the handwriting search module 36 determines that a feature amount similar to the feature amount of the search key is included in the feature amounts of the target handwritten document.

If a feature amount similar to the feature amount of the search key is included in the feature amounts of the target handwritten document (YES in block B108), the target handwritten document is added to the retrieved document list (that is, a list of handwritten documents including the search key) (block B109). If no feature amount similar to the feature amount of the search key is included in the feature amounts of the target handwritten document (NO in block B108), the processing proceeds to block B110.

If the search key is not handwritten input data (that is, the search key is character codes corresponding to a character string input by using the keyboard) (NO in block B104), the character search module 37 reads a character code series corresponding to the target handwritten document from the character search database 43 (block B113), and determine whether the character code (character code series) of the search key is included in the character code series of the target handwritten document (block B114). Then, if the character code of the search key is included in the character code series of the target handwritten document (YES in block B114), the character search module 37 adds the target handwritten document to the retrieved document list (block B115). If no character code of the search key is included in the character code series of the target handwritten document (NO in block B114), the processing proceeds to block B110.

Next, the search determination module 35 determines whether all handwritten documents to be searched have been processed (block B110). If there is an unprocessed handwritten document to be searched (NO in block B110), a new target handwritten document is set by returning to block B103 and, as described above, the process to determine whether the new target handwritten document is a document including the search key is performed. If all handwritten documents to be searched have been processed (YES in block B110), the transmitter 39 transmits the handwritten document data 41A corresponding to handwritten documents in the retrieved document list to the client terminal 2B, 2C that requested the handwritten document search (block B111).

Accordingly, the client terminal 2B, 2C can display the handwritten document corresponding to the search key and a list thereof on the screen by using the handwritten document data 41A transmitted from the server 1.

According to the present embodiment, as described above, a handwritten document can be precisely retrieved. In the present embodiment, when a handwritten document search based on a search key is requested, one of the handwriting search and the character search is performed depending on whether the search key includes handwritten input data (stroke data) and whether the creation user who created a target handwritten document of stored handwritten documents 41A is the search user who requested the handwritten document search. If the search key includes handwritten input data and the creation user is the search user, the handwriting search of retrieving handwritten document data including the search key is performed by using feature amounts of strokes in the handwritten document and feature amounts of strokes in the search key. If the search key includes handwritten input data and the creation user is not the search user, the character search of retrieving handwritten document data including the search key is performed by using character codes corresponding to handwritten characters recognized from strokes in the handwritten document and character codes corresponding to handwritten characters recognized from strokes in the search key. If the search key includes character codes, the character search of retrieving handwritten document data including the search key is performed by using character codes corresponding to handwritten characters recognized from strokes in the handwritten document and character codes in the search key. By using the handwriting search and the character search in different conditions as described above, the search of handwritten documents can be precisely performed by making use of respective advantages of the handwriting search and the character search.

All the process procedures on a handwritten document according to this embodiment can be realized by a computer program. Thus, the same advantageous effects as with the present embodiment can easily be obtained simply by installing a computer program, which executes the process procedures, into an ordinary computer through a computer-readable storage medium which stores the computer program, and by executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a storage processor configured to store handwritten document data and a plurality of character codes in storage, the handwritten document data comprising a plurality of stroke data corresponding to a plurality of strokes input by handwriting operation and the plurality of character codes corresponding to the plurality of stroke data; and
a search module configured to:
perform at least one of a handwriting search according to strokes of a first search key and a character search according to a character code of a second search key, first stroke data corresponding to the strokes of the first search key retrieved from the handwritten document data in the handwriting search, and
second stroke data corresponding to the character code of the second search key retrieved from the plurality of character codes in the character search,
wherein the search module is configured to perform the handwriting search if a user who created the handwritten document data is the user who requested the handwritten document data search.

2. The information processing apparatus of claim 1, wherein the search module is configured processing circuitry to determine that the handwritten document data comprises the first search key if feature amounts of the plurality of stroke data comprises a feature amount whose similarity to a feature amount of the stroke data of the first search key is equal to or more than a threshold.

3. The information processing apparatus of claim 1, wherein the search module is configured to determine that the handwritten document data comprises the second search key if the plurality of character codes corresponding to the plurality of stroke data comprise the one or more character codes of the second search key.

4. The information processing apparatus of claim 1, wherein the search module is configured to perform the character search when the second search key comprises one or more character code.

5. The information processing apparatus of claim 1, wherein the search module is configured to acquire one or more character codes by recognizing handwritten characters of the second search key when the second search key is handwritten, and to perform the character search by using the acquired character codes.

6. The information processing apparatus of claim 1, further comprising a display circuitry to display the plurality of strokes and to highlight first strokes of the plurality of strokes, the first strokes corresponding to the first search key or the second search key.

7. The information processing apparatus of claim 1, further comprising a touch-screen display,
wherein the first search key or the second search key is handwritten by using the touch-screen display and
wherein the touch-screen display is configured to display the plurality of strokes and to display strokes corresponding to the first stroke data or second stroke data retrieved by the search module.

8. A handwritten document search method comprising:
  storing handwritten document data and a plurality of character codes in storage, the handwritten document data comprising a plurality of stroke data corresponding to plurality of strokes input by a handwriting operation and the plurality of character codes corresponding to the plurality of stroke data; and
  performing by a search module at least one of a handwriting search according to strokes of a first search key and a character search according to a character code of a second search key, first stroke data corresponding to the strokes of the first search key retrieved from the handwritten document data in the handwriting search, and
second stroke data corresponding to the character code of the second search key retrieved from the plurality of character codes in the character search,
  wherein the search module is configured to perform the handwriting search if a user who created the handwritten document data is the user who requested the handwritten document data search.

9. A computer-readable, non-transitory storage medium having stored thereon a program which is executable by a computer, the program controlling the computer to execute functions of:
  storing handwritten document data and a plurality of character codes in storage, the handwritten document data comprising a plurality of stroke data corresponding to a plurality of strokes input by handwriting operation and the plurality of character codes corresponding to the plurality of stroke data; and
  performing at least one of a handwriting search according to strokes of a first search key and a character search according to a character code of a second search key, first stroke data corresponding to the strokes of the first search key retrieved from the handwritten document data in the handwriting search, and
second stroke data corresponding to the character code of the second search key retrieved from the plurality of character codes in the character search,
  wherein the computer is configured to perform the handwriting search if a user who created the handwritten document data is the user who requested the handwritten document data search.

10. The method of claim 8, wherein the performing at least a handwriting search comprises determining that the handwritten document data comprises the first search key if feature amounts of the plurality of stroke data comprises a feature amount whose similarity to a feature amount of the stroke data of the first search key is equal to or more than a threshold.

11. The method of claim 8, wherein the performing at least a character search comprises determining that the handwritten document data comprises the second search key if the plurality of character codes corresponding to the plurality of stroke data comprise the one or more character codes of the second search key.

12. The method of claim 8, further comprising performing the character search when the second search key comprises one or more character codes.

13. The method of claim 8, wherein the performing at least a character search comprises acquiring one or more character codes by recognizing handwritten characters of the second search key when the second search key is handwritten, and performing the character search by using the acquired character codes.

14. The method of claim 8, further comprising displaying the plurality of strokes on a display and highlighting first strokes of the plurality of strokes on the display, the first strokes corresponding to the first search key or the second search key.

15. The method of claim 8, further comprising displaying the plurality of strokes on a touch-screen display and displaying strokes corresponding to the retrieved first stroke data or the retrieved second stroke data on the touch-screen display, the first search key or the second search key being handwritten by using the touch-screen display.

16. The medium of claim 9, wherein the performing at least a handwriting search comprises determining that the handwritten document data comprises the first search key if feature amounts of the plurality of stroke data comprises a feature amount whose similarity to a feature amount of the stroke data of the first search key is equal to or more than a threshold.

17. The medium of claim 9, wherein the performing at least a character search comprises determining that the handwritten document data comprises the second search key if the plurality of character codes corresponding to the plurality of stroke data comprise the one or more character codes of the second search key.

18. The medium of claim 9, the program further controlling the computer to execute function of performing the character search when the second search key comprises one or more character codes.

19. The medium of claim 9, wherein the performing at least a character search comprises acquiring one or more character codes by recognizing handwritten characters of the second search key when the second search key is handwritten, and performing the character search by using the acquired character codes.

20. The medium of claim 9, the program further controlling the computer to execute function of displaying the plurality of strokes on a display and highlighting first strokes of the plurality of strokes on the display, the first strokes corresponding to the first search key or the second search key.

21. The medium of claim 9, the program further controlling the computer to execute function of displaying the plurality of strokes on a touch-screen display and displaying strokes corresponding to the retrieved first stroke data or the retrieved second stroke data on the touch-screen display, the first search key or the second search key being handwritten by using the touch-screen display.

* * * * *